Oct. 16, 1934. C. L. EKSERGIAN 1,977,567

METHOD OF WELDING

Filed June 21, 1932

INVENTOR.
CAROLUS L. EKSERGIAN.
BY
ATTORNEY.

Patented Oct. 16, 1934

1,977,567

UNITED STATES PATENT OFFICE 1,977,567

METHOD OF WELDING

Carolus L. Eksergian, Detroit, Mich., assignor to Budd Wheel Company, Philadelphia, Pa., a corporation of Pennsylvania Application June 21, 1932, Serial No. 618,484

1 Claim. (Cl. 219—10)

My invention relates to welding and more particularly to a method of uniting annular members to disc-like members.

It is especially desirable in manufacturing and fabrication of vehicle wheels and other substantially similar shaped articles that the parts be united with the minimum number of operations possible. If the parts may be united together by a single welding operation, less energy is used and less time is consumed and also a homogeneous interlock between the two parts is obtained.

I attain the above enumerated advantageous features by forming co-operating substantially radially extending arcuate section portions and forming projections or spuds upon one of said co-operating portions, butt-welding said members together to said projections only and pushing said members into nested co-operation upon the said co-operating portions.

My invention will be better understood from the following description when considered in connection with the accompanying drawing, and its scope will be pointed out in the appended claim.

In the accompanying drawing.

Figure 1:
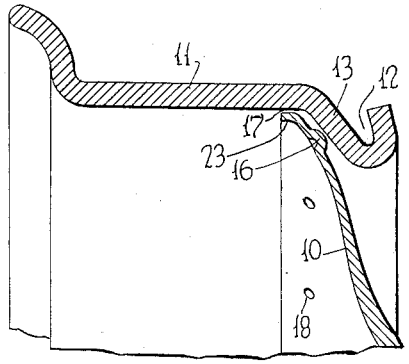
Figure 1 shows the parts in position prior to the welding operation.

In Fig. 1 I have shown a wheel body comprising a tapered disc 10 adapted to be joined to a rim 11. The rim member is of the usual or customary form having a gutter 12, the axially inward portion of which 13 extends substantially radially. This member is the ordinary rim of commerce and it is not necessary to change it by any special formations. However, should it be desirable for some reason or other, spuds or projections may be formed upon the rim member in this gutter portion instead of upon the co-operating portion of the wheel body.

Figure 4:
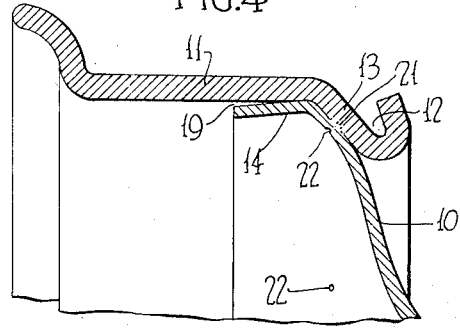
Fig. 4 is an exaggerated showing indicating the condition of the parts where an axially extending flange is formed on the disc member.
Figure 5:
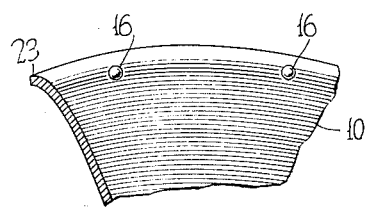
Fig. 5 shows the disc with the projections formed thereon prior to being united to the rim.

The disc 10 is made in the usual fashion with the exception that there is no substantially axially extending portion 14 as in Fig. 4. The disc has a peripheral portion 15 extending substantially radially and of arcuate cross section adapted for nested co-operation with the corresponding arcuate portion 13 of the rim 11. I find it preferable to form the spuds or projections 16 upon the disc member in this arcuate portion forming a slight indentation 18 on the opposite side of the wheel body.

Figure 2:
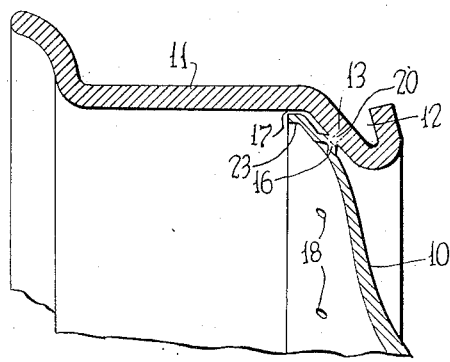
Fig. 2 shows the parts in position with the welding operation substantially completed and immediately precedent to the push-up.
Figure 3:
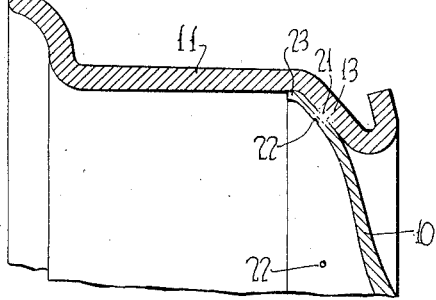
Fig. 3 shows the completed product resulting from the herein disclosed method.

As is readily seen in Fig. 1 at 17, there is an appreciable spacing of the wheel body and the rim at all points except at the spuds. In Fig. 2 the two members have been placed in contact through the spud portions and the operation has been continued to the point wherein the spud 16 has reached a plastic condition as has also the adjacent portion 20 of the rim. This position corresponds substantially to that occurring immediately precedent to the push-up. In other words the condition shown to be existing in Fig. 2 is that at the time the welding current is cut off just prior to the parts being pushed together so that a homogeneous formation 21 will occur at the spudded portions between the two members along the co-operating radially extending arcuate portions of the rim. The wheel body will be forced into a nested relation resulting in the article in Fig. 3.

The spud 16 in Fig. 1 has an appreciable indentation 18 opposed to it on the other side of the disc. After the completion of the wheel formation these indentations are much smaller inasmuch as they have partially filled in as in Fig. 3 or 4. The only portion of the wheel body 10 resembling a flange is at 23. It is so proportioned that it does not contact with the axial or cylindrical portion of the rim unless during the push up additional force is exerted to deform it outwardly. It is normally so designed to nest snugly with the arcuate portion 24 on the inner side of the rim forming the angular portion between the base of the rim and its gutter.

In Fig. 4 for the purpose of more clearly showing the advantageous features of my method, I have shown the usual rim member having an axially extending flange 14 united by my same method. In this instance the space between the two parts 19, although exaggerated, would actually exist, if the welds were made simultaneously according to my method. Of course, if the welded formation were made by a consecutive plurality of individual spot welds this condition need not and would not occur. However, the advantageous feature of my method lies in the simultaneous accomplishment of a plurality of welds at spaced points about the co-operating peripheries of the two members at one and the same time. The current paths between the two parts, as is readily seen, goes through the projections only, as there are no other contacting portions of the two parts until after the current has been cut off and the members united by the push-up.

The embodiment of the invention illustrated and described herein has been selected for the purpose of clearly setting forth the principles involved. It is apparent that the invention is susceptible of being modified to meet different conditions encountered in its use and I therefore aim to cover by the appended claim all modifications within the true spirit and scope of the invention.

What I claim is:

The method of securing straight sided rims provided with gutters for demountable retaining flanges, to a pressed metal wheel support for such rim, which wheel support carries the radial load of the rim upon peripheral complemental seating surfaces between the inner periphery of the rim and the outer periphery of the support therefor, which consists in providing axially extending welding spuds on one of those radially extending walls of the gutter and the wheel support which are axially juxtaposed when the rim and its support are in assembled relation, placing the pressed metal support within the rim from the side of the rim opposite to that on which the gutter is located, bringing the axially juxtaposed walls of the support and the gutter into such proximity to each other that the spuds on the one wall engage the other wall without effecting contact between the periphery of the supporting member and the rim, passing electric current through a plurality of said spuds and forcing the parts together under welding pressure to electrically spud weld them together and bring the axially juxtaposed walls into contiguity, and through this movement into contiguity for the first time effecting a contact between the inner periphery of the rim and the outer periphery of the supporting member and thereby constituting the peripheral complemental seating surfaces which carry the radial load from the rim to the wheel body.

CAROLUS L. EKSERGIAN.